(12) United States Patent
Tesauri

(10) Patent No.: US 9,371,199 B2
(45) Date of Patent: Jun. 21, 2016

(54) APPARATUS FOR PALLETIZING BOTTLES OR SIMILAR CONTAINERS

(71) Applicant: EMMETI S.p.A., Montecchio Emilia (Reggio Emilia) (IT)

(72) Inventor: Iames Gianni Tesauri, Montecchio Emilia (IT)

(73) Assignee: EMMETI S.p.A., Montecchio Emilia (Reggio Emilia) (IT)

( * ) Notice: Subject to any disclaimer, the term of this patent is extended or adjusted under 35 U.S.C. 154(b) by 58 days.

(21) Appl. No.: 14/398,778

(22) PCT Filed: May 8, 2013

(86) PCT No.: PCT/IB2013/053689
§ 371 (c)(1),
(2) Date: Nov. 4, 2014

(87) PCT Pub. No.: WO2013/168100
PCT Pub. Date: Nov. 14, 2013

(65) Prior Publication Data
US 2015/0086318 A1    Mar. 26, 2015

(30) Foreign Application Priority Data

May 10, 2012    (IT) .............................. TO2012A0421

(51) Int. Cl.
*B65G 57/22*        (2006.01)
*B65G 57/24*        (2006.01)
*B65G 61/00*        (2006.01)
*B65G 57/03*        (2006.01)

(52) U.S. Cl.
CPC ................ *B65G 57/24* (2013.01); *B65G 57/03* (2013.01); *B65G 61/00* (2013.01); *B65G 2201/0244* (2013.01)

(58) Field of Classification Search
CPC ........ B65G 57/24; B65G 57/03; B65G 61/00; B65G 57/081; B65G 57/183; B65G 57/18; B65G 2201/0244; B65G 57/26; B65G 57/00; B65B 5/068
USPC ............. 414/799, 791.3, 791.4, 791.6–791.8, 414/792, 792.6–792.8, 794.2
See application file for complete search history.

(56) References Cited

U.S. PATENT DOCUMENTS

| | | | | |
|---|---|---|---|---|
| 5,636,966 A * | 6/1997 | Lyon | .................... | B65G 1/1378 414/789.6 |
| 6,379,106 B1 * | 4/2002 | Baldi | .................... | B65G 59/02 414/796.9 |
| 6,431,817 B1 * | 8/2002 | Simkowski | ............ | B65G 57/24 414/788.9 |
| 6,658,816 B1 * | 12/2003 | Parker | .................. | B65G 57/005 414/2 |
| 7,581,919 B2 * | 9/2009 | Bolzani | ................ | B65G 57/005 414/791.6 |
| 2011/0286825 A1 | 11/2011 | Michels | | |

FOREIGN PATENT DOCUMENTS

| | | |
|---|---|---|
| EP | 1908711 A1 | 5/2011 |
| EP | 2316762 A1 | 5/2011 |
| JP | S60137723 A | 7/1985 |

OTHER PUBLICATIONS

International Search Report and Written Opinion dated Jul. 11, 2013 for Application No. PCT/IB2013/053689.

* cited by examiner

*Primary Examiner* — Stephen Vu
(74) *Attorney, Agent, or Firm* — Patterson & Sheridan, L.L.P.

(57) ABSTRACT

Apparatus for palletizing bottles or similar containers, comprising: a conveyor including a support structure and a closed ring belt having a horizontal branch movable in a direction of transport (A) and having an upper surface on which a layer of bottles (B) or similar containers rests when in use, and a movable pickup device positionable above the conveyor for picking up said layer of bottles (B) from the belt and movable in a palletizing station for depositing the layer of bottles (B) on the base of a pallet or on a previously deposited layer of bottles, wherein the pickup device comprises a frame open at the bottom and a shutter movable relative to the frame between a retracted position in which the shutter leaves the lower opening of the frame open and an extended position in which the shutter closes the lower opening of the frame, wherein, in use, the shutter during the movement from the retracted position to the extended position is inserted between the layer of bottles (B) and the upper surface of said horizontal branch, so as to transfer the layer of bottles (B) from the conveyor to the pickup device.

6 Claims, 6 Drawing Sheets

APPARATUS FOR PALLETIZING BOTTLES OR SIMILAR CONTAINERS

FIELD OF THE INVENTION

The present invention relates in general to the glass industry and concerns an apparatus for palletizing bottles or similar containers.

DESCRIPTION OF THE PRIOR ART

In the glass industry, product containers, such as bottles or the like, are usually packed in pallets at the output of the production line. Each pallet is formed by a base on which several layers of bottles or similar containers are stacked, with each layer formed by a plurality of parallel rows.

To implement palletizing, the bottles forming a layer are arranged so as to occupy a space with plan dimensions corresponding to those of the pallet. The layer of bottles is arranged on a conveyor belt which moves the layer of bottles to a pickup station. The layer of bottles is picked up by a movable pickup device that is positioned above the conveyor belt; it picks up the layer of bottles and moves it to a palletizing station to deposit the layer of bottles' on the base of a pallet or on a previously deposited layer of bottles.

The pickup device usually comprises a frame open at the bottom and a shutter that is movable relative to the frame between an initial position in which the shutter keeps the lower opening of the frame open and a pickup position in which the shutter closes the lower opening of the frame. During the movement from the initial position to the pickup position the shutter is inserted between the layer of bottles and the upper surface of the belt, so as to transfer the layer of bottles from the conveyor to the pickup device.

The document EP-A-1908711 describes various solutions that have the object of creating an empty space between the layer of bottles and the upper surface of the belt, so as to facilitate the insertion of the shutter below the layer.

In apparatus of this type the efficient support of the belt and the containers during the insertion phase of the shutter below the containers is also required.

OBJECT AND SUMMARY OF THE INVENTION

The present invention aims to provide an apparatus for palletizing bottles and similar containers that allows the simple insertion of the shutter below the layer of bottles, whilst at the same time ensuring an effective support of the belt and the layer of bottles during the insertion of the shutter.

According to the present invention, this object is achieved by an apparatus having the features forming the subject of claim 1.

Preferred features of the invention are the subject of the dependent claims.

The claims form an integral part of the disclosure herein provided in relation to the invention.

BRIEF DESCRIPTION OF THE DRAWINGS

The present invention will now be described in detail with reference to the attached drawings, provided purely by way of non-limiting example, wherein.

DESCRIPTION OF EMBODIMENTS OF THE INVENTION

Figure 1:
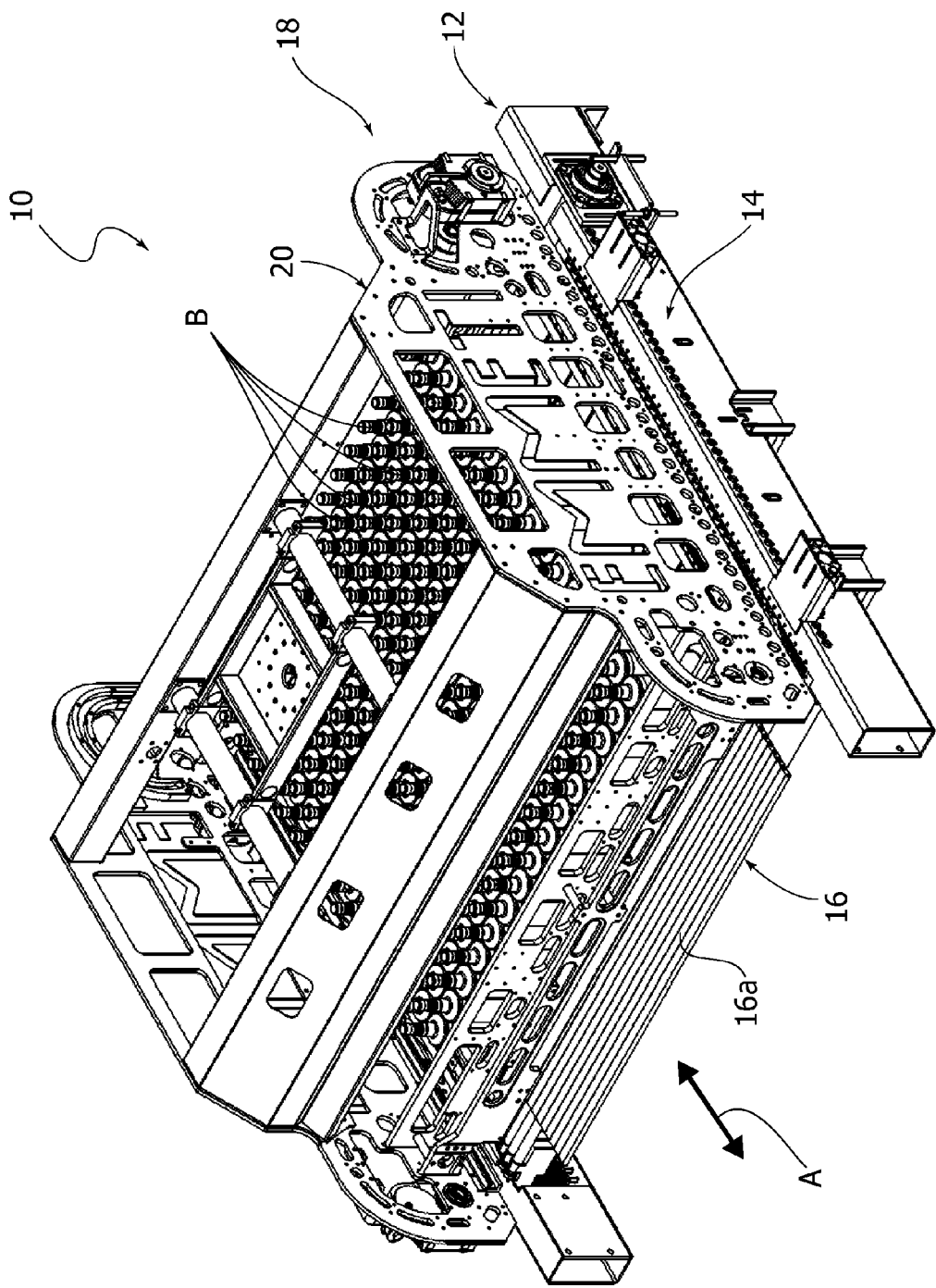
FIG. 1 is a perspective view of an apparatus for palletizing bottles or similar containers according to the present invention.

With reference to FIG. 1, numeral 10 shows an apparatus for palletizing bottles or similar containers according to the present invention. The apparatus 10 comprises a conveyor 12 including a support structure 14 that carries a closed ring belt 16 cooperating with a motorized pulley. The belt 16 may be formed, for example, by a plastic or metallic articulated mesh chain, as is customary in the glass industry for the transport of bottles and similar containers through ovens and the like. The belt 16 has a horizontal upper branch 16a which is movable in a direction of transport indicated by the double arrow A. The horizontal branch 16a has an upper surface on which a layer of bottles B rests, arranged in parallel rows juxtaposed to each other. The bottles B are ordered on the horizontal branch 16a of the belt 16 according to a width and depth that correspond to the width and depth of a pallet.

Figure 2:
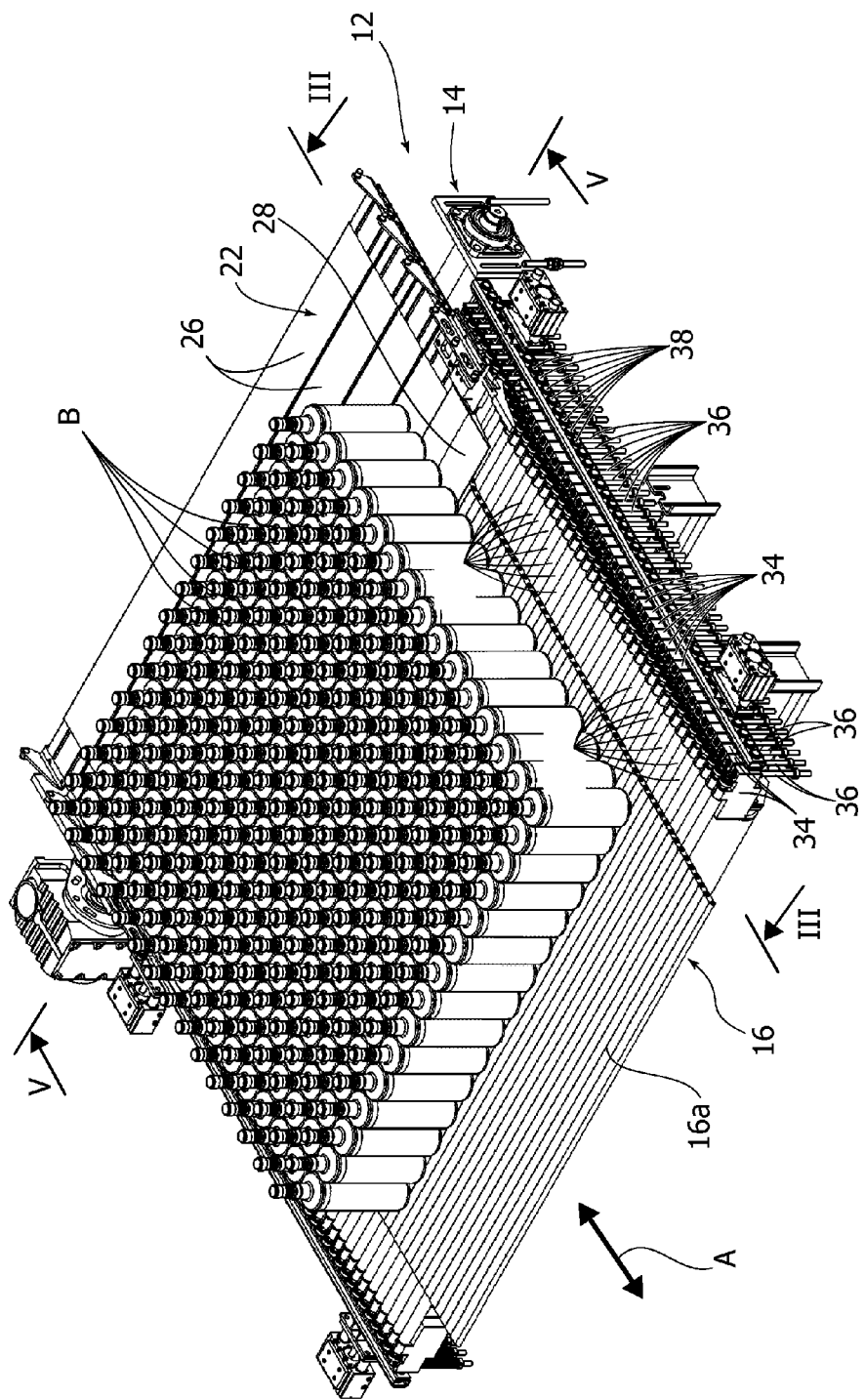
FIG. 2 is a perspective view of the apparatus of FIG. 1 with some components removed.

The apparatus 10 comprises a movable pickup device configured for picking up the layer of bottles B from the belt 16 and for depositing the layer of bottles B on the base of a pallet or on a previously deposited layer of bottles B. The movable pickup device 18 is moved by an electronically controlled robot. The pickup device 18 comprises a frame 20 open at the bottom that is intended to be positioned from above around the layer of bottles B located on the belt 16, as shown in FIG. 1. The pickup device 18 includes a shutter 22 (FIG. 2) that is movable relative to the frame 20 between a retracted position in which the shutter 22 keeps the lower opening of the frame 20 open and a pickup position in which the shutter 22 closes the lower opening of the frame 20. As shown in FIG. 2, during the movement in the direction A from the retracted position to the extended position, the shutter 22 is inserted below the layer of bottles B. In the pickup position the shutter 22 is completely inserted under the layer of bottles B. When the shutter 22 is completely inserted between the layer of bottles B and the horizontal branch 16a of the conveyor 16, the layer of bottles B is supported by the shutter 22 and can be lifted and moved by the pickup device 18.

The shutter 22 includes a plurality of transverse slats 26 articulated to each other about respective transverse axes with respect to the direction of movement A.

The transverse slats 26 are supported at their lateral ends by the frame 20 of the device. The shutter has a wedge-shaped slat 28 at one end which facilitates the insertion of the shutter 22 below the layer of bottles B.

Figure 3:
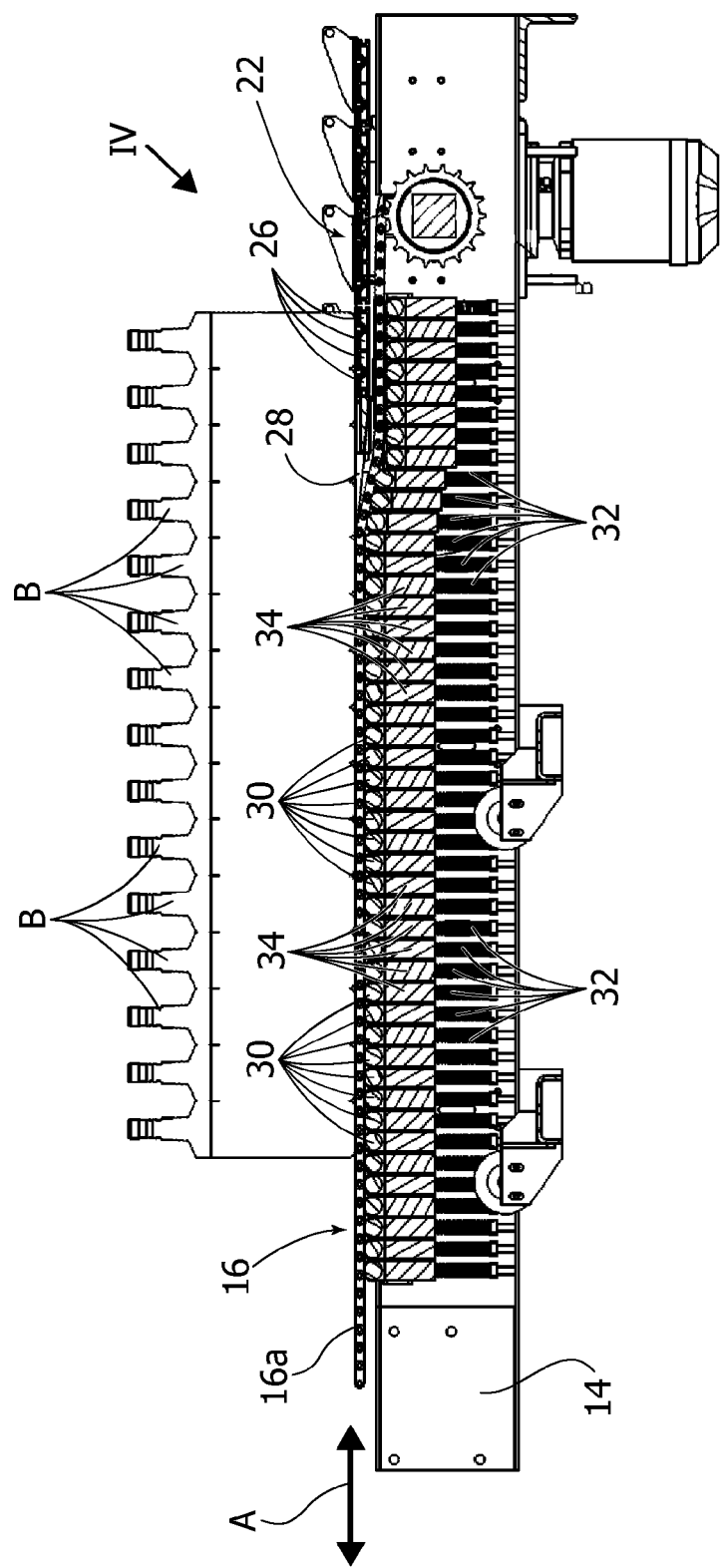
FIG. 3 is a section along the line of FIG. 2.
Figure 4:
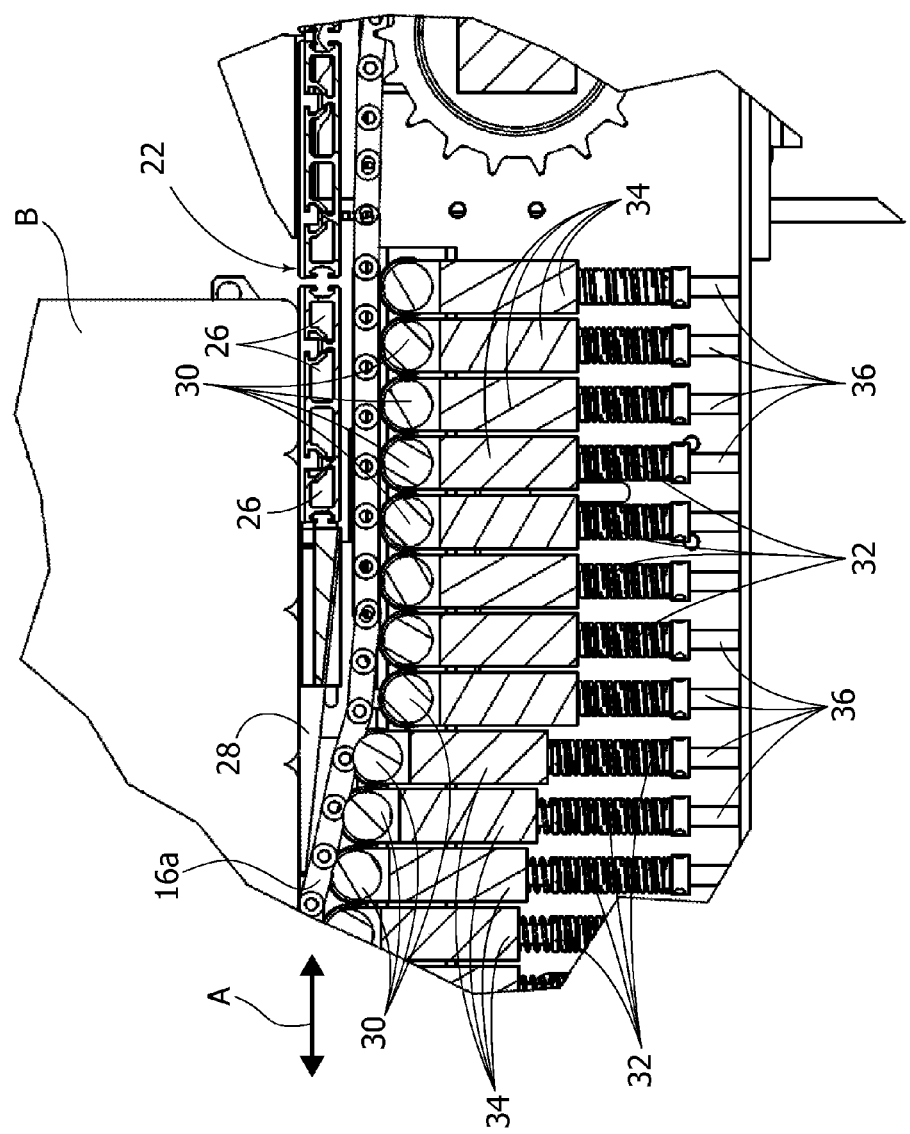
FIG. 4 is an enlarged detail of the part indicated by the arrow IV in FIG. 3.

With reference to FIGS. 3 and 4, the support structure 14 of the conveyor 12 comprises a plurality of transverse bars 30 that extend orthogonally with respect to the direction of movement A of the belt 16. The transverse bars 30 are located below the horizontal branch 16a of the belt 16 and support the weight of the horizontal branch 16a of the conveyor 16 and the layer of bottles B resting on it. The transverse bars 30 may have a circular cross section and can be rotatably supported about their respective axes. The transverse bars 30 are movable in the vertical direction independently of each other between a raised position and a lowered position. The transverse bars 30 are associated with respective elastic or pneumatic means 32 that push the bars 30 towards the respective raised positions.

In the embodiment illustrated in the Figures, each transverse bar 30 is supported at its lateral ends by two supports 34. Each support 34 is guided in the vertical direction by a fixed pin 36 with a vertical axis. The elastic means which push the bars 30 up are composed, for example, of helical compression springs arranged coaxially to the pins 36 and which push the respective lateral supports 34 upwards.

As is particularly visible in the detail of FIG. 4, when the shutter 22 is inserted under the layer of bottles B, the shutter 22 pushes the horizontal branch 16a down as it gradually moves in the direction A. The downward movement of the horizontal branch 16a of the belt 16 is permitted by the downward movement of the transverse bars 30. In this way, a space is created between the bottoms of bottles B and the upper surface of the horizontal branch 16a. This space is occupied by the shutter 22 which replaces the belt 16 to support the layer of bottles B. The downward movement of the branch 16a is facilitated by the wedge shape of the slat 28 located at the front end of the shutter 22. In front of the shutter 22, the transverse bars 30 remain in the raised position and support the weight of the branch 16a of the belt 16 and the bottles B resting on it.

This arrangement allows the transfer of the bottles B from the belt 16 to the shutter 22 with essentially no vertical movement of the bottles B. In fact, the shutter 22 essentially moves in the same plane as the horizontal branch 16a of the belt 16.

According to a preferred feature of the present invention, the bars 30 are locked in the lowered position during the insertion of the shutter 22, so as to avoid friction between the belt 16 and the shutter 22 due to the upward thrust of the transverse bars 30.

Figure 5:
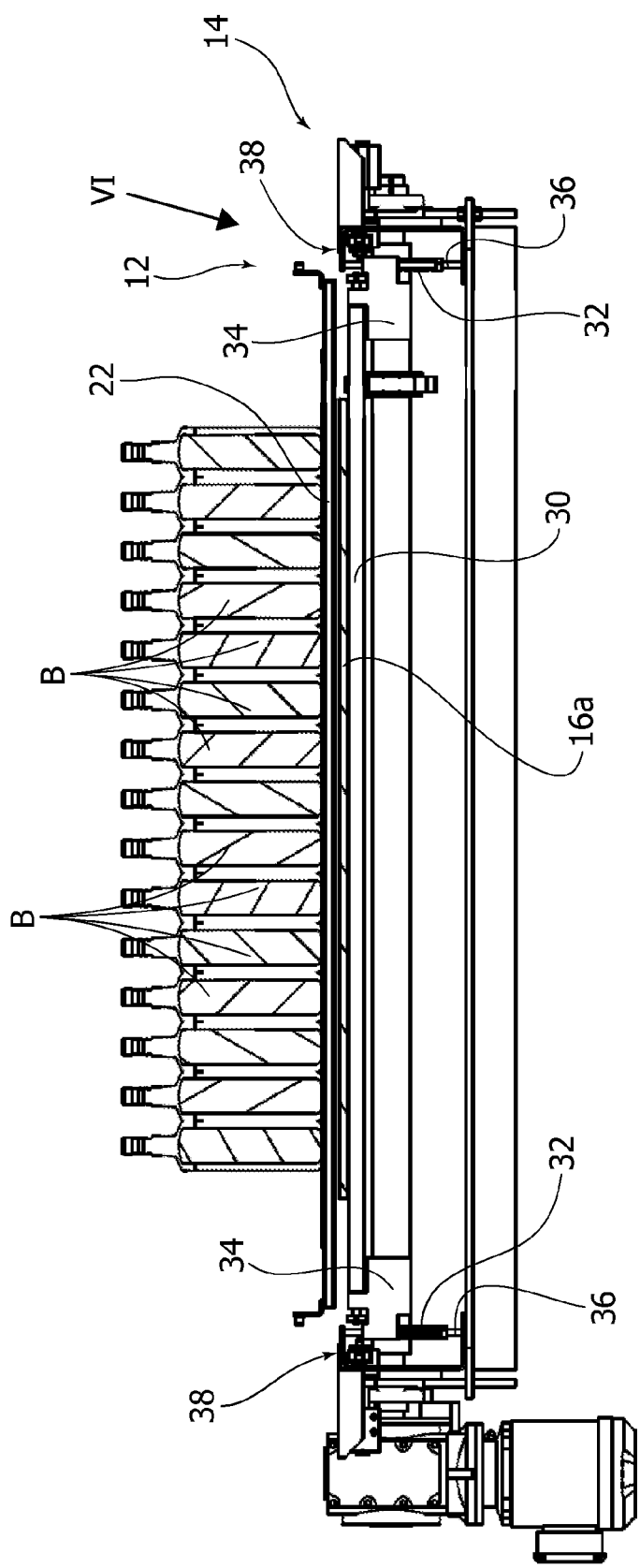
FIG. 5 is a section along the line V-V of FIG. 2, and FIGS. 6, 7 and 8 are details on an enlarged scale of the part indicated by the arrow VI in FIG. 5 in different positions.

With reference to FIGS. 5 to 8, this function is obtained by means of locking elements 38 located along the lateral sides of the conveyor 12 and cooperating with the lateral supports 34 of the transverse bars 30. With reference to FIG. 5, each transverse bar 30 is associated with a pair of locking elements 38 which cooperate with the two lateral supports 34 that carry the bar 30.

Figure 6:
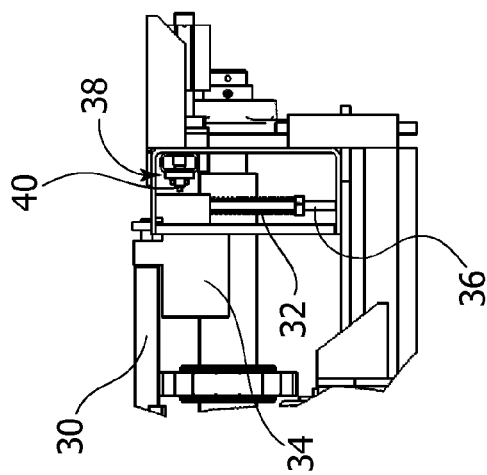
Figure 8:
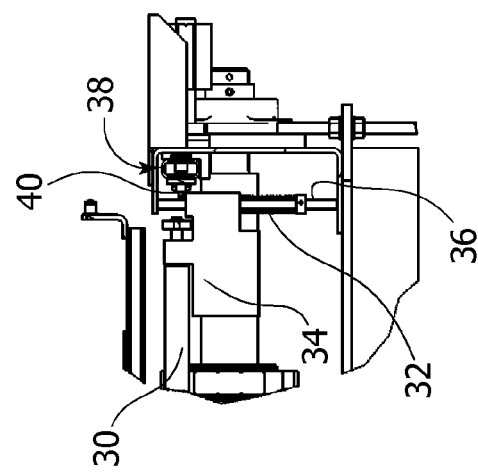
Figure 7:
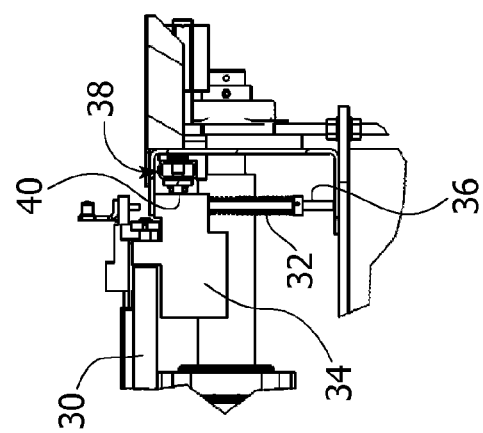

With reference to FIGS. 6 to 8, each locking element 38 is movable in the transverse direction between a deactivated position illustrated in FIG. 6 and an activated position illustrated in FIGS. 7 and 8. The movement of the locking elements 38 from the activated position to the deactivated position can be obtained, for example, by pneumatic or electrical actuators. Each locking element 38 has a locking pin 40 elastically pushed outwards. When the locking elements 38 are brought into the activated position, the locking pin 40 of each locking element 38 is pressed against the lateral side of a respective lateral support 34, as shown in FIG. 7. When the lateral support 34 is pushed downwards during the insertion of the shutter 22, the locking pin 40 engages an upper surface of the respective lateral support 34 as shown in FIG. 8 and maintains the lateral support 34 in the lowered position against the upward thrust of the spring 32. Once the transfer of the bottles B onto the shutter 22 is completed, the locking elements 38 are brought into their deactivated position of FIG. 6, in this way allowing the bars 30 to return to their raised position under the thrust of the springs 32.

Of course, without prejudice to the principle of the invention, the details of construction and the embodiments may vary widely with respect to those described and illustrated without departing from the scope of the invention as defined by the claims that follow.

The invention claimed is:

1. Apparatus for palletizing bottles or similar containers, comprising:
   a conveyor including a support structure and a closed ring belt having a horizontal branch movable in a direction of transport (A) and having an upper surface on which a layer of bottles (B) or similar containers rests when in use; and
   a movable pickup device positionable above the conveyor for picking up said layer of bottles (B) from the belt and movable in a palletizing station for depositing the layer of bottles (B) on the base of a pallet or on a previously deposited layer of bottles, wherein the pickup device comprises a frame having a lower opening at a bottom and a shutter movable relative to the frame between a retracted position in which the shutter leaves the lower opening open and an extended position in which the shutter closes the lower opening, wherein, in use, the shutter during the movement from the retracted position to the extended position is inserted between the layer of bottles (B) and an upper surface of said horizontal branch, so as to transfer the layer of bottles (B) from the conveyor to the pickup device,
   characterized in that the support structure of the conveyor comprises a plurality of transverse bars orthogonal to the direction of transport (A) of the belt and on which said horizontal branch of the belt rests, said bars being movable in the vertical direction independently of each other between a raised position and a lowered position against the action of an elastic or a pneumatic member and wherein the shutter pushes said bars towards the lowered position when it moves above the horizontal branch of the belt between the retracted position and the extended position, so as to create a space between the bottoms of bottles (B) and the upper surface of the horizontal branch of the belt in which the shutter is inserted.

2. Apparatus according to claim 1, characterized in that each of said bars is carried by a pair of lateral supports guided in the vertical direction and elastically pushed upwards.

3. Apparatus according to claim 2, characterized in that each of said lateral supports is slidable in the vertical direction on a respective fixed pin and is associated with a respective helical spring arranged coaxially to said pin.

4. Apparatus according to claim 1, characterized in that said bars are associated with respective locking elements configured to lock the respective bar in the lowered position.

5. Apparatus according to claim 4, characterized in that each of said locking devices is movable between a deactivated position and an activated position, said locking devices being associated for controlling the movement of the locking devices from the activated position to the deactivated position, and back to the activated position.

6. Apparatus according to claim 4, characterized in that each of said locking devices comprises an elastically movable pin configured to engage an upper surface of a respective lateral support of the transverse bar.

* * * * *